(No Model.)
E. T. STARR.
HAND MIRROR.
No. 305,640. Patented Sept. 23, 1884.
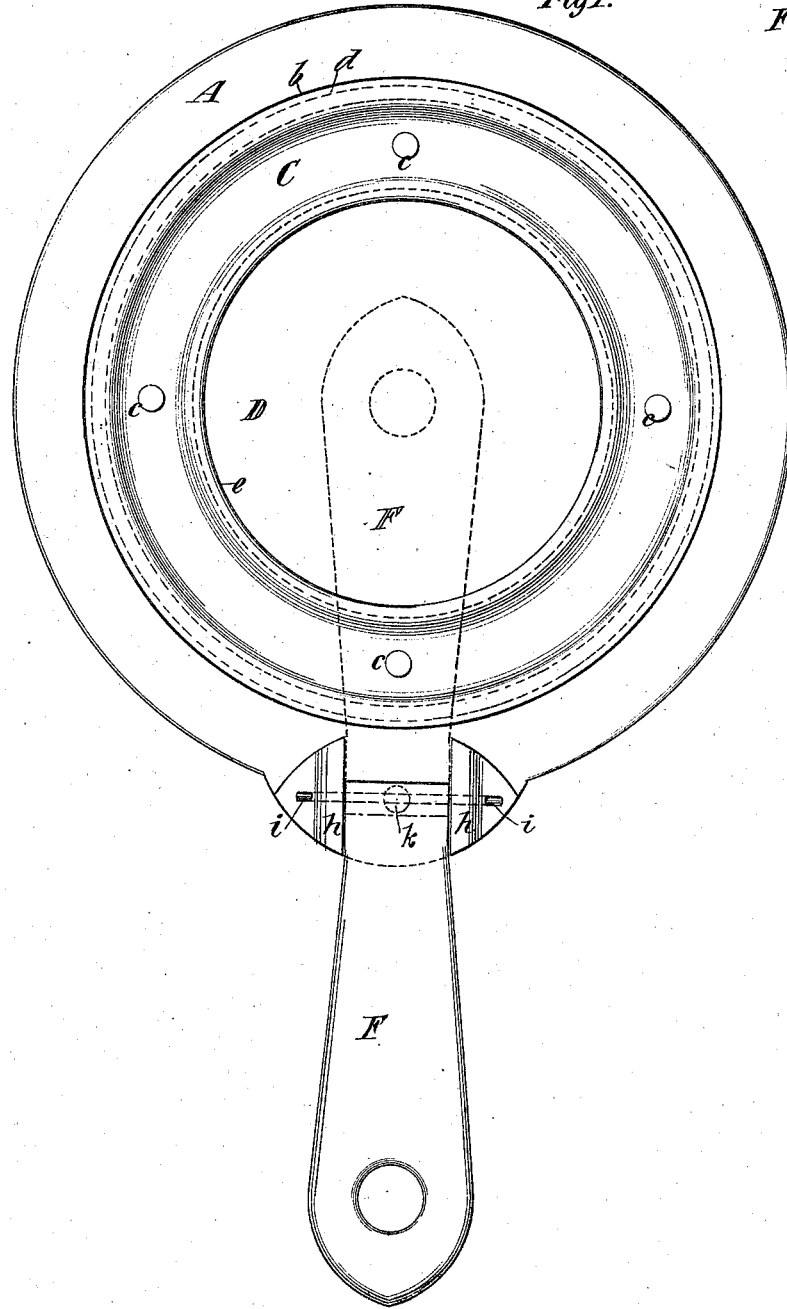
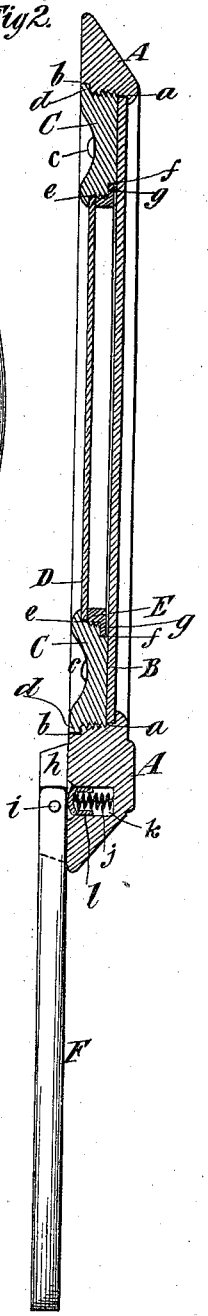
Witnesses
Inventor
Eben T. Starr
by his Attorneys
Brown & Brown

UNITED STATES PATENT OFFICE.

EBEN T. STARR, OF NEW YORK, N. Y.

HAND-MIRROR.

SPECIFICATION forming part of Letters Patent No. 305,640, dated September 23, 1884.

Application filed April 25, 1883. (No model.)

*To all whom it may concern:*

Be it known that I, EBEN T. STARR, of the city of New York, in the county and State of New York, have invented a new and useful Improvement in Hand-Mirrors, of which the following is a specification.

My invention consists in various novel combinations of parts, which I will first describe, and then point out in the claims.

In the accompanying drawings, Figure 1 is a back view of a mirror embodying my invention, and Fig. 2 is a central section thereof.

Similar letters of reference designate corresponding parts in both the figures.

The several parts of the mirror may be of wood, metal, or other material, or of any molded composition which will form a good imitation of india-rubber or vulcanite.

A designates the frame, which may be externally of any shape, and may have its face ornamented in any way. The back of the frame is rabbeted at $a$ to receive the glass B, and is internally screw-threaded. The rabbet $a$ forms an inwardly-projecting lip, which is at the front of the frame. The glass B is inserted into the frame from the back, and rests against this lip, which forms the bottom of the rabbet. The front of the frame then presents a fine finish, as the lip which retains the glass is a part of the frame, and there is no joint visible, as there is where the frame is rabbeted at the front, and has a ring screwed in from the front to secure the glass in the frame. At the extreme back of the frame I form a supplemental rabbet, $b$.

C designates the ring, which is externally screw-threaded and screwed into the rabbet $a$ from the back of the frame, so as to secure the glass B in place. The ring may be turned in or unscrewed by frictional engagement of the fingers with it, or it may be provided with teats or projections $c$, to form rests for the fingers in turning it. At the back the ring C is provided with a small flange, $d$, which fits in the supplemental rabbet $b$ and gives a neater finish to the ring than it would have if it were screw-threaded clear to its back edge.

In lieu of a ring, I may secure the glass by a disk or plate screwed into the rabbet $a$, like the ring. I prefer, however, to employ a ring, C, because I can then secure a supplemental glass, D, in the ring. This supplemental glass D may be a magnifying-glass or a plain glass, like the glass B. I have here represented the supplemental glass D as secured in the same manner as the glass B. The ring C has a rabbet, $e$, in its inner side, which receives the glass D, and a supplemental rabbet, $f$, and the glass is secured by a second ring, E, screwed into the rabbet $e$, and having a flange, $g$, which fits the rabbet $f$.

F designates the handle, which is arranged between lugs or ears $h$ on the back of the frame A, and is hinged by a pin, $i$. This handle may be turned into the position shown in full lines in Fig. 1 when it is desired to hold the mirror in the hand, or it may be turned over onto the back of the mirror in the position shown in dotted lines in Fig. 1.

In order to secure the handle in either position, I may employ a spring, $j$, arranged in a recess, $k$, in the back of the frame, as shown in Fig. 2. As shown, the spring is of spiral form, and its end is covered by a cap, $l$, which bears on the handle. By bearing upon one or the other of the flat opposite sides of the handle the spring serves to hold the handle in either of the two positions described.

The glass which is used varies somewhat in thickness, and consequently the outer face of the ring C may not in all cases be flush with the back face of the frame A. As the ring is at the back of the mirror, a slight variation in its position relatively to the frame is immaterial.

What I claim as my invention, and desire to secure by Letters Patent, is—

1. The combination, with a mirror-frame having a rabbet in its back, of a glass fitting in said rabbet, a ring fitting in said rabbet and securing the glass therein, and a supplemental and smaller glass secured in said ring and having its face presented at the back of the mirror, substantially as described.

2. The combination of the mirror-frame A, having the rabbet $a$, the glass B, the ring C, fitting said rabbet, and having in its inner side the rabbet $e$, the supplemental glass D, and the ring E, fitting in the rabbet $e$, all substantially as described.

3. The combination of the frame A, having the recess $k$, the handle F, hinged at $i$, and having its opposite sides flat, and the spring $j$ and its cap $l$, all substantially as and for the purpose described.

EBEN T. STARR.

Witnesses:
FREDK. HAYNES,
CHANDLER HALL.